United States Patent [19]

Uemura

[11] Patent Number: 4,497,105

[45] Date of Patent: Feb. 5, 1985

[54] METHOD OF MANUFACTURING SOLID ELECTROLYTE CHIP CAPACITORS

[75] Inventor: Toshihiko Uemura, Kyoto, Japan

[73] Assignee: Matsuo Electric Company, Ltd., Toyonaka, Japan

[21] Appl. No.: 524,320

[22] Filed: Aug. 18, 1983

[30] Foreign Application Priority Data

Aug. 20, 1982 [JP] Japan ................................ 57-145126

[51] Int. Cl.³ ........................ H01L 21/64; H01G 4/00; H01G 9/08
[52] U.S. Cl. ........................................ 29/570; 29/589; 29/25.42; 361/433; 357/72
[58] Field of Search ............. 29/570, 588, 589, 576 R, 29/25.42; 361/433; 357/72

[56] References Cited

U.S. PATENT DOCUMENTS

| | | | |
|---|---|---|---|
| 3,550,228 | 12/1970 | Asscher | 29/25.42 |
| 3,855,505 | 12/1974 | Karlick | 361/433 |
| 4,059,887 | 11/1977 | Galvagni | 29/570 |
| 4,247,883 | 1/1981 | Thompson et al. | 361/433 |
| 4,282,645 | 8/1981 | Thompson et al. | 29/570 |

Primary Examiner—Brian E. Hearn
Assistant Examiner—David A. Hey
Attorney, Agent, or Firm—Eugene E. Geoffrey, Jr.

[57] ABSTRACT

A method of manufacturing solid electrolyte chip capacitors. Each capacitor comprises a substantially rectangular capacitor element having a cathode layer surrounding it, an anode conductor rod protruding therefrom and a pair of electrode terminals disposed on the bottom face thereof. A metal strip, such as the material of electrode terminals, is punched and pressed to form pairs of L-shaped terminals with horizontal legs connected to the remainder of the strip, which face toward and spaced from each other by a distance corresponding to the full length of the capacitor element, each of the vertical legs has a pair of facing side wings separated by a distance corresponding to the width of the capacitor element. The capacitor element is inserted in each enclosure defined by the vertical legs and their wings and positioned precisely, and then encapsulated with synthetic resin. The resultant products are cut off from the strip.

3 Claims, 16 Drawing Figures

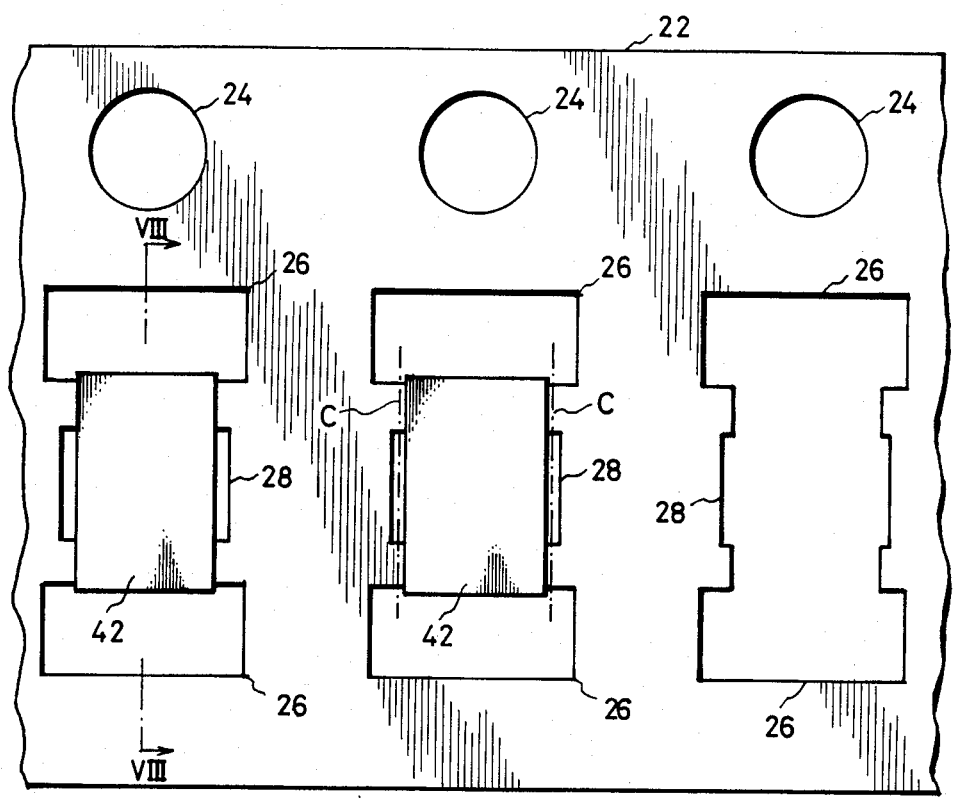
FIG. 7
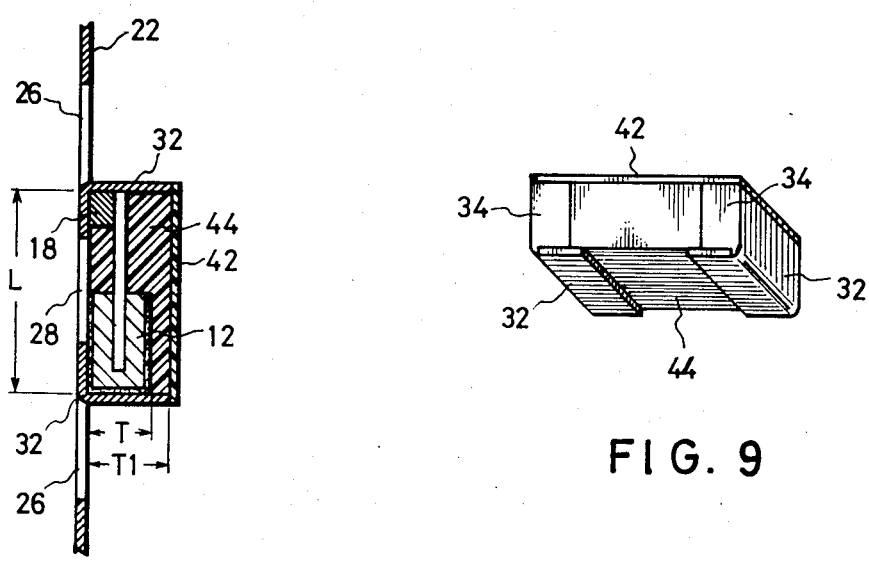
FIG. 8
FIG. 9

METHOD OF MANUFACTURING SOLID ELECTROLYTE CHIP CAPACITORS

This invention relates to an improved method of manufacturing solid electrolyte chip capacitors which are especially convenient for use on a printed circuit board.

An electrolyte capacitor of this type has a pair of electrode terminals on the bottom face thereof and a capacitor element encapsulated in synthetic resin. Various methods have been proposed for manufacturing this type of capacitor automatically in mass. An example is disclosed in U.S. Pat. No. 4,247,883 granted to D. G. Thompson et al, in which a pair of L-shaped terminal members are arranged facing each other, a capacitor element is disposed therebetween, and the assembly is encapsulated with synthetic resin. This method has a disadvantage in that a special device, such as an assembling jig, is needed for accurately positioning the terminal members and the capacitor element. Another example, which has been rather improved, is disclosed in U.S. Pat. No. 3,550,228 granted to J. C. Asscher, in which a metal strip is progressively punched and pressed to form a pair of electrode terminals the ends of which are left connected to the remainder of the strip, and a capacitor element is then put between both terminals. After the electrodes of the capacitor element are electrically connected to the terminals, respectively, the assembly is encapsulated with resin and, then, separated from the strip by cutting. In this method, however, it is still insufficient to position the capacitor element with respect to the terminal members, though the latter can be positioned accurately.

Accordingly, an object of this invention is to provide an improved method of manufacturing solid electrolyte chip capacitors of this type automatically in mass fashion, without the above described disadvantages.

According to the method of this invention, substantially rectangular capacitor elements are first prepared, each having a cathode layer on the outer surface thereof and an anode conductor rod protruding from one end face thereof. A metal strip is punched and press-shaped progressively to form a series of pairs of facing electrode terminals at fixed intervals. Each electrode terminal has an L-shaped cross-section having a vertical leg portion standing erect from the plane of the metal strip and a horizontal leg portion connected to the remainder of the strip. The vertical leg portion has a pair of side wings extending from the side edges thereof towards the other terminal of the same pair and facing each other at a distance corresponding to the width of the capacitor element. The vertical leg portions of the pair of terminals are disposed facing each other at a distance corresponding to the whole length of the capacitor element inclusive of the anode conductor rod, thereby forming a rectangular enclosure together with both side wings. The capacitor element is inserted into the enclosure of each pair of terminals and the cathode layer and the anode rod are electrically connected respectively to both terminals. Then, the assembly is encapsulated with synthetic resin and cut off from the remainder of the strip.

The invention will be described in more detail hereinunder with reference to the accompanying drawings illustrating a preferred embodiment thereof.

IN THE DRAWINGS

FIGS. 1(a) and 1(b) are plan and perspective views of a capacitor element used in the electrolyte solid capacitor made by the method of this invention;

FIGS. 2(a) and 2(b) are plan and perspective views of a metal piece used conveniently for assembling the capacitor;

FIGS. 3(a) and 3(b) are plan and perspective views of a sub-assembly of the capacitor;

FIG. 7 is a plan view of the same part of the strip in the last step of the method of this invention;

FIG. 8 is a cross-sectional view of the capacitor assembly along line VIII—VIII of FIG. 7; and FIG. 9 is a perspective view of the solid electrolyte capacitor produced by the method of this invention.

Throughout the drawings, like reference numerals are used to denote corresponding parts and components.

Figure 1A:
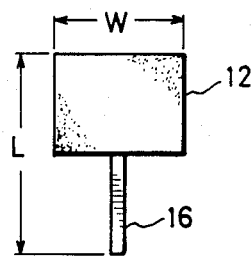
Figure 1B:
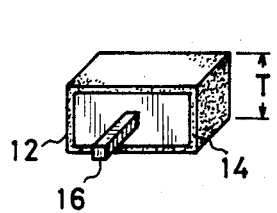

In FIGS. 1(a) and 1(b), a capacitor element 12 is shown which is first prepared. The capacitor element 12 has a cathode layer 14 on the outer surface and an anode conductor rod 16 protruding from one end face thereof, and may be made through any known process such as described in U.S. Pat. No. 3,855,505 granted to S. Karlik, Jr., for example. The element 12 has a substantially rectangular parallelepiped shape with length L inclusive of the anode rod 16, width W and thickness T.

Figure 2A:
Figure 2B:
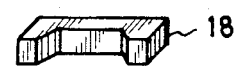
Figure 3A:
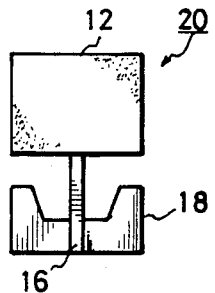
Figure 3B:
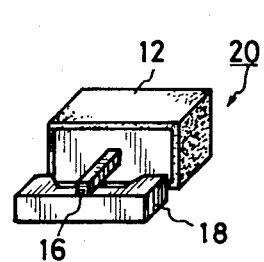

In the second step of the illustrated embodiment, a U-shaped metal piece 18 as shown in FIGS. 2(a) and 2(b) is prepared and, then, electrically connected by welding or soldering, as shown in FIGS. 3(a) and 3(b). The metal piece 18 preferably has the width W and a thickness of about T/2 so that the bottom faces of the element 12 and the metal piece 18 become flush when assembled. Thus, obtained is a capacitor subassembly 20 having maximum length, width and thickness of L, W and T, respectively.

The above-mentioned steps can be carried out automatically in known manner and will not be described further since there is no feature of this invention.

Figure 4:
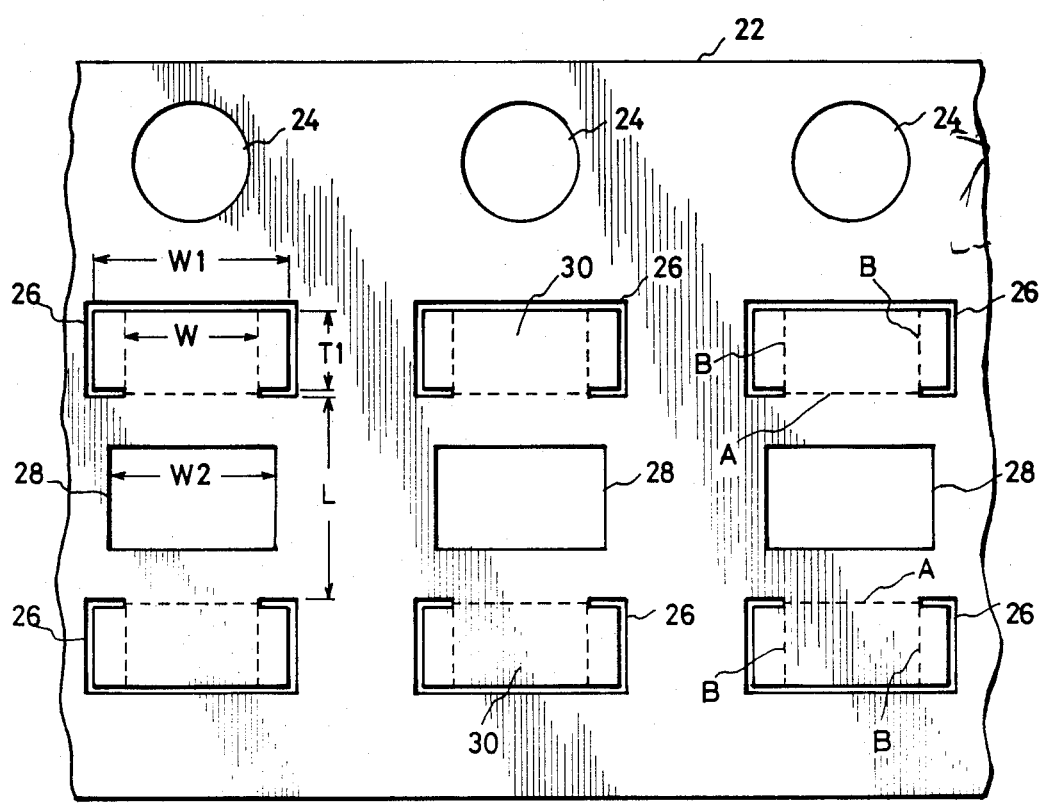
FIG. 4 is a plan view of a part of the metal strip punched in a pattern in the earliest step of the method of this invention.

On the other hand, as shown in FIG. 4, a metal strip 22 is punched to form a series of patterns at predetermined constant intervals. As shown in the drawing, each pattern includes a circular pilot hole 24, a pair of rectangular C-shaped slots 26 and a rectangular aperture 28. The area 30 defined by the slot 26 corresponds to the vertical portion of the resilient terminal and the aperture 28 corresponds to the separation between the horizontal portions of the terminals. Dimensions W and L as shown correspond to the above-mentioned width and length of the capacitor element 12, respectively. Dimension W2 is selected greater than W and less than W1, and dimension T1 is selected slightly greater than T, the thickness of the element 12. The strip 22 may be made of suitable conductive solderable metal such as nickel, copper of nickel silver and, for example, has a thickness of about 0.1 millimeters and the length L of the element 12 of about 3 millimeters. The pilot hole 24 is used in known manner for accurately positioning each pattern in each working location.

Figures 5A, 5B, 5C:
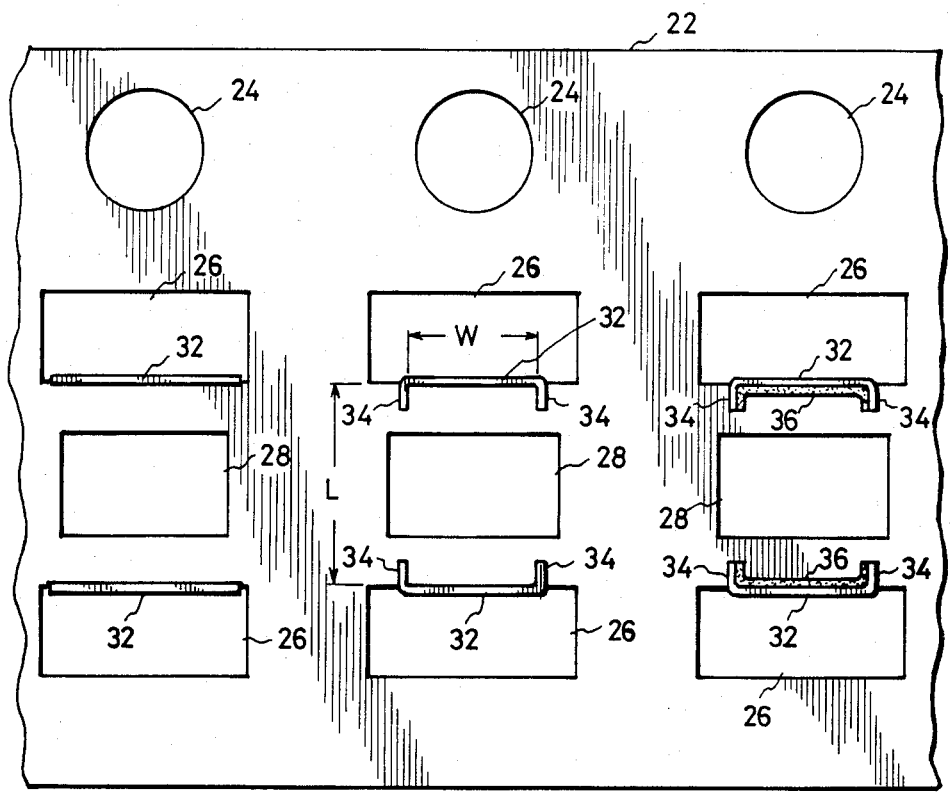
FIGS. 5 and 6 are plan views of the same part of the strip in the intermediate steps of the method of this invention.

In the next step, as shown in FIG. 5(a), the areas 30 of the punched pattern are folded upwardly at a right angle along dashed lines A of FIG. 4 to form vertical portions 32 of the terminals. Then, both wing portions 34 of the vertical portions 32 are folded inwardly at a right angle along dashed lines B of FIG. 4 to form a rectangular enclosure of length L and width W over the aperture 28, as shown in FIG. 5(b). Next, solder paste 36 is applied to the inner surface of the vertical portions 32 of the terminals, as shown in FIG. 5(c).

Figures 6A, 6B, 6C:
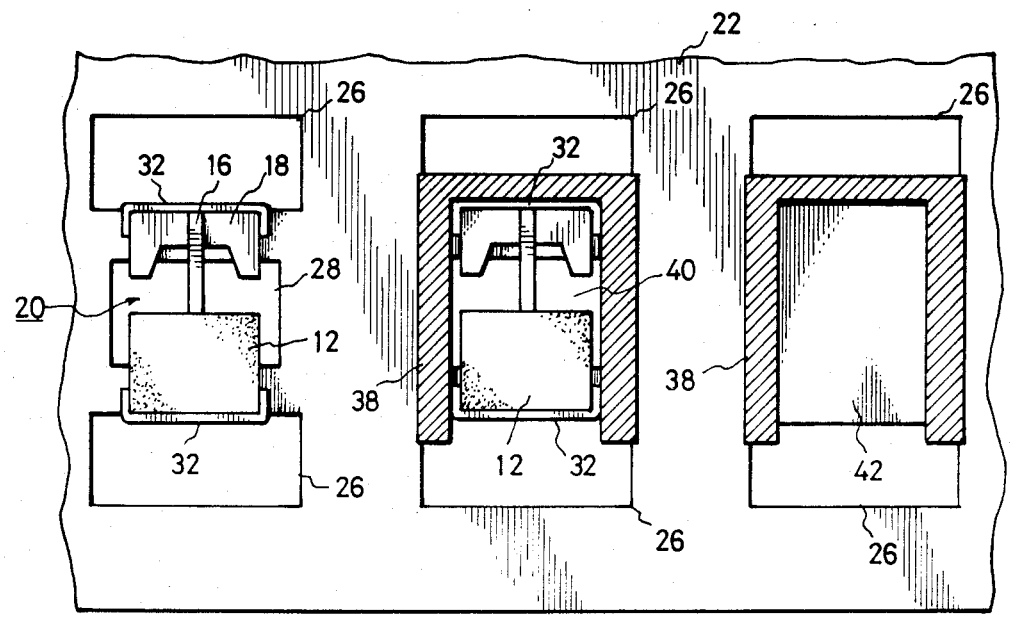

Thereafter, as shown in FIG. 6(a), the capacitor assembly 20 as shown in FIG. 3 is put in the enclosure defined by the vertical portions 32 of the terminals and their side wings 34. As previously described, the size of the enclosure coincides with that of the assembly 20 and accurate positioning can be obtained. In this state, the metal strip 32 is heated locally by suitable means (not shown) to melt solder in the solder paste 36 to effect soldering of the electrodes of the capacitor to the corresponding terminals. In the next step, as shown in FIG. 6(b), a metal mold 38 is applied to the capacitor-terminal assembly and suitable air-hardening or thermosetting adhesive resin, such as acryl or epoxy resin, is injected into the cavity 40 of the assembly to embed the capacitor element 12 therein. Before hardening of the adhesive resin, a thin, flat and smooth nonconductive plastic plate 42, such as polyimide resin plate, is put on the filled resin to cover the assembly.

After hardening of the resin, the metal mold 38 is removed and the resultant encapsulated capacitor with resin package 44, as shown in FIGS. 8 and 9, is separated from the metal strip 22 by cutting it along lines C as shown in FIG. 7.

As described above, the capacitor element 12 can be easily and accurately positioned between a pair of electrode terminals 32 in accordance with the method of this invention. While the metal piece 18 of FIG. 2 is used for facilitating the positioning operation, it may be omitted optionally and, in this case, the anode rod 16 may be soldered or welded directly to the corresponding terminal 32. It will be desired in this case to provide a positioning hole or slot in one of the terminals as disclosed also in the aforementioned United States patents.

What is claimed is:

1. A method of manufacturing solid electrolyte chip capacitors comprising steps of preparing capacitor elements each having a substantially rectangular cross-section and including a cathode layer formed on the outer surface thereof, punching and press-shaping a single conductive metal strip to form successive pairs of terminal members each having a vertical portion standing erect from the plane of said strip, forming openings in said strip between said pairs of terminal members each having a width less than the distance between said terminal members and a length greater than the length of said terminal members so that each terminal member has an L-shaped cross section, the distance between the vertical portions of each pair of terminal members being substantially equal to the overall length of the capacitor elements inclusive of the anode conductor, folding end portions of each vertical portion inwardly at a right angle to form side wings with the distance therebetween being substantially equal to the width of the capacitor element placing one of said capacitor elements between each pair of said terminal members and electrically connecting each pair of said terminal members to said cathode layer and said anode conductor, respectively, of the capacitor disposed therebetween, encapsulating said capacitor elements with synthetic resin and then separating each of encapsulated capacitor elements from the remainder of said strip.

2. The method according to claim 1 including a further step of electrically connecting a metal piece to the end of said anode conductor, the vertical dimension of said metal piece being selected to render its bottom surface to be flush with that of said capacitor element, and the lateral dimension of said metal piece being selected to be substantially equal to the width of said capacitor element.

3. The method according to claim 1 including a further step of putting an electrically insulating, thin and flat synthetic resin plate on the surface of said encapsulating resin before hardening of said resin.

* * * * *